United States Patent [19]
Cote

[11] 3,742,298
[45] June 26, 1973

[54] ARC GAP CIRCUITS FOR FLASHING HIGH-VOLTAGE PHOTOFLASH LAMPS

[75] Inventor: Paul T. Cote, Cleveland Heights, Ohio

[73] Assignee: General Electric Company, Schenectady, N.Y.

[22] Filed: Mar. 24, 1971

[21] Appl. No.: 127,562

[52] U.S. Cl............... 315/323, 315/69, 431/95, 431/DIG. 3
[51] Int. Cl.. H05b 37/00, H05b 41/34, G03b 15/04
[58] Field of Search................. 315/323, 289, 171, 315/69; 431/92–98; 95/11.5 R, 11.5 A

[56] References Cited
UNITED STATES PATENTS

| 3,167,014 | 1/1965 | Kopito | 431/92 X |
| 3,532,931 | 10/1970 | Cote et al. | 431/95 X |
| 3,500,451 | 3/1970 | Yando | 95/11.5 R X |
| 3,528,354 | 9/1970 | Nakagawa | 431/95 X |

FOREIGN PATENTS OR APPLICATIONS

| 404,577 | 1/1969 | Australia | 95/11 L |

Primary Examiner—Rudolph V. Rolinec
Assistant Examiner—Marvin Nussbaum
Attorney—Norman C. Fulmer, Henry P. Truesdell, Frank L. Neuhauser, Oscar B. Waddell and Joseph B. Forman

[57] ABSTRACT

Circuit arrangements of arc gaps in series with high-voltage photoflash lamps, for improving reliability of flashing and for causing sequential flashing of individual lamps of an array of photoflash lamps by means of high-voltage firing pulses such as are produced by impacting a piezoelectric element in synchronism with the opening of a camera shutter.

7 Claims, 4 Drawing Figures

PATENTED JUN 26 1973　　3,742,298

Inventor:
Paul T. Coté
by Norman C. Fulmer
His Attorney

ARC GAP CIRCUITS FOR FLASHING HIGH-VOLTAGE PHOTOFLASH LAMPS

BACKGROUND OF THE INVENTION

The invention is in the field of circuits for flashing photoflash lamps, and particularly for flashing high-voltage lamps from high-voltage firing pulses such as are produced by impacting or otherwise stressing a piezoelectric element in synchronism with the opening of a camera shutter. The circuits of the invention are useful for flashing individual photoflash lamps, and also are useful for causing selective or random sequential flashing of the individual lamps of an array of flash lamps.

Photoflash lamps may be classified generally into two voltage types: low-voltage and high-voltage. The low-voltage types usually are intended to be flashed by a battery, or a charged capacitor, having a voltage of about 1.5 volts to 15 volts, whereas the high-voltage flash lamps are intended to be flashed by a firing pulse of a few hundred volts or greater such as can be produced by a piezoelectric element.

Low-voltage flash lamps have achieved commercial success, and various mechanisms have been developed for flashing individual lamps, and also for flashing, one-at-a-time, lamps of a multiple-lamp arrangement such as the popular flashcube. Also, various designs have been proposed for an array of flash lamps having reflectors associated therewith for directing the light from all of the lamps in the same direction. Various switching mechanisms and circuits have been devised for causing the lamps of the array to flash, one-at-a-time, each time a camera shutter is opened to take a picture. An advantage of such an array is that it need not be moved or rotated between flashes as is the case with the flashcube.

High-voltage flash lamps, in contrast to the low-voltage type, have not achieved appreciable commercial success, in spite of their important advantageous capability of being flashed by means of a small, lightweight, and longlife piezoelectric element and hence not requiring the use of heavy and bulky batteries with their attendant drawbacks such as requiring recharging or replacement and which frequently fail to provide adequate firing pulse energy due to their connections being loose, dirty, oxidized or corroded. An obstacle in the path of commercial success of the high-voltage type of flash lamp, is that many switching mechanisms and firing circuits usable for low-voltage lamps are unsuited or unfeasible for use with high-voltage lamps. Also, the rate-of-rise time of firing pulses produced by a piezoelectric element tends to be somewhat too slow for insuring optimum flashability of typical flash lamps.

SUMMARY OF THE INVENTION

Objects of the invention are to provide improved circuitry for reliably flashing high-voltage flash lamps, and to provide circuits for causing sequential individual flashing of the lamps of an array of high-voltage flash lamps from sequential high-voltage firing pulses produced in synchronism with a camera shutter each time a flash picture is to be taken.

The invention comprises, briefly and in a preferred embodiment, an arc gap connected in electrical series combination with a high-voltage flash lamp, this series combination being adapted for connection across a source of high-voltage firing pulses. An embodiment of the invention comprises a plurality of high-voltage flash lamps, and a plurality of arc gaps of differing voltage breakdown characteristics respectively connected in series combinations with the flash lamps, these series combinations being connected in a parallel combination adapted for connection across a source of high-voltage firing pulses. A further embodiment comprises a plurality of high-voltage flash lamps, and a plurality of arc gaps successively connected in series between the flash lamps so as to connect the lamps in electrical parallel combination through the arc gaps, an end of this parallel combination being adapted for connection across a source of high-voltage firing pulses.

DESCRIPTION OF THE PREFERRED EMBODIMENT

Figure 1:
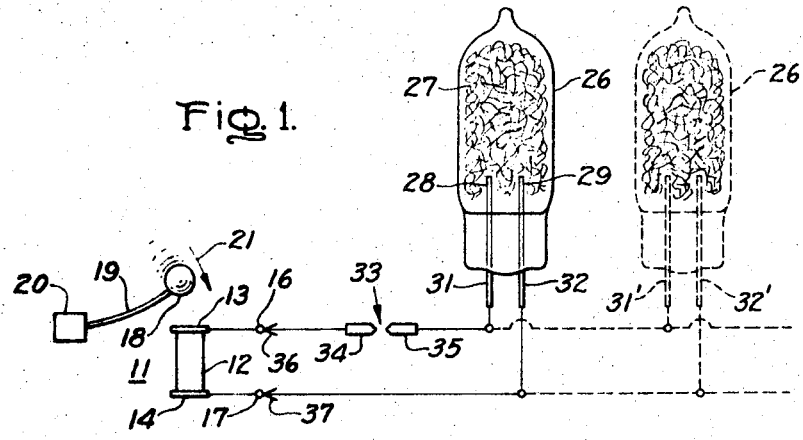
FIG. 1 is a diagram, partly pictorial and partly schematic, of a preferred embodiment of the invention.

In FIG. 1, a source 11 of firing pulse energy comprises a piezoelectric element 12 which may be in the form of a small cylinder having electrodes 13 and 14 at the top and bottom thereof, connected respectively to firing pulse terminals 16 and 17. An impactor 18 is carried at the end of an elongated spring 19, the other end of which is fixed by means 20 which may be carried by a camera housing or in a shutter mechanism. The impactor 18 may be arranged to be raised away from the piezoelectric element 12 when the camera shutter is cocked, and released upon opening of the shutter to take a picture whereupon the spring 19 urges the impactor 18 in the direction of the arrow 21 so as to impact against the piezo-electric element 12 thereby producing a firing pulse at the terminals 16 and 17. The piezoelectric element 12 may be, for example, approximately one-eighth inch in diameter and one-fourth inch long, and may be made from barium titanate, lead metaniobate, PZT (lead-zirconium-titanate) or other suitable piezoelectric material. Further details of piezoelectric means for producing photoflash firing pulses, and camera synchronizing means, are disclosed in U.S. Pat. Nos. 2,972,937 and 3,106,080, both to Chauncey G. Suits and assigned to the same assignee as the present invention.

A high-voltage photoflash lamp 26, having the usual glass envelope containing shredded metal foil 27, is provided with a pair of electrodes 28 and 29 extending within the lamp. One or both of the electrodes 28 and 29 is coated with a primer material. The metal foil 27 is in contact with both of the electrodes 28 and 29 and/or their primer coatings, so that when a high-voltage firing pulse is applied to these electrodes, the circuit is completed through the shredded metal foil 27 whereby numerous sparks occur in the primer material, thereby igniting the primer and causing the bulb to flash. Lead wires 31 and 32 are respectively connected to the electrodes 28 and 29. Further details of a high-voltage photoflash lamp are disclosed in U.S. Pat. No. 2,868,003 to Warren F. Albrecht and assigned to the same assignee as the present invention. Such a lamp may be flashed by means of a firing pulse of approximately 500 volts. Filament type flash lamps may be employed, if the filament is of sufficiently high resistance for causing the lamp to be flashed by a high-voltage, low-current firing pulse.

An arc gap 33 is connected between one of the firing pulse terminals 16 and one of the lead wires 31 of the lamp 26, the other firing pulse terminal 17 being connected to the other lead wire 32 of the lamp 26, thus connecting the electrodes of lamp 26 across the firing pulse terminals 16 and 17, in series with the arc gap 33. The arc gap 33 comprises a pair of spaced-apart electrodes 34 and 35, which may be wires or other electrical conductors suitably positioned to define an air gap of, for example, about one-thousandth of an inch. Alternatively, the arc gap 33 may comprise a dielectric gap, composed of a pair of conductors such as wires spaced apart by a thin piece of dielectric material such as a polymer, designed so that the arc gap will break down at a few hundred volts.

The circuit of FIG. 1 functions as follows. When the piezoelectric element 12 is impacted by the impactor 18, in synchronism with the opening of a camera shutter, the piezoelectric element 12 becomes stressed and produces a voltage pulse of approximately 1000 to 2000 volts, for example, depending somewhat upon the force of impact. When the rising wavefront of the firing pulse voltage, which is impressed across the arc gap 33 through the high-resistance conductive path of the lamp 26 (since no current is flowing at this time, there will be no voltage drop through the lamp 26) reaches the breakdown potential of the arc gap 33, the gap 33 will break down and provide a relatively low resistance path for the high-voltage firing pulse to reach the lamp 26, causing it to flash. Since the arc gap 33 breaks down only when the wavefront of the high-voltage pulse has reached a few hundred volts or so, it insures that the lamp 26 will receive a sudden burst of firing pulse energy, thereby insuring that even "stubborn" lamps will flash.

If desired, a plurality of additional flash lamps 26' may be connected in parallel with the first lamp 26, these lamps having relatively different firing voltage characteristics so that each occurrence of a firing voltage pulse will cause flashing of only that one unflashed lamp in the circuit having the lowest flashing voltage characteristic. Thus, each time a flash picture is to be taken, the high-voltage firing pulse causes flashing of one of the plurality of lamps of the array, the lamps all being arranged with reflectors so as to direct their light in the same given direction. For this purpose the arc gap 33 should be an air gap, which has repeatable breakdown characteristics, rather than a dielectric gap which does not have repeatable breakdown characteristics. The array of flash lamps may be provided with connectors 36 and 37 adapted to plug into or otherwise removably engage the high-voltage firing pulse terminals 16 and 17 which may be provided on a camera or on a flash adaptor attachment.

Figure 2:
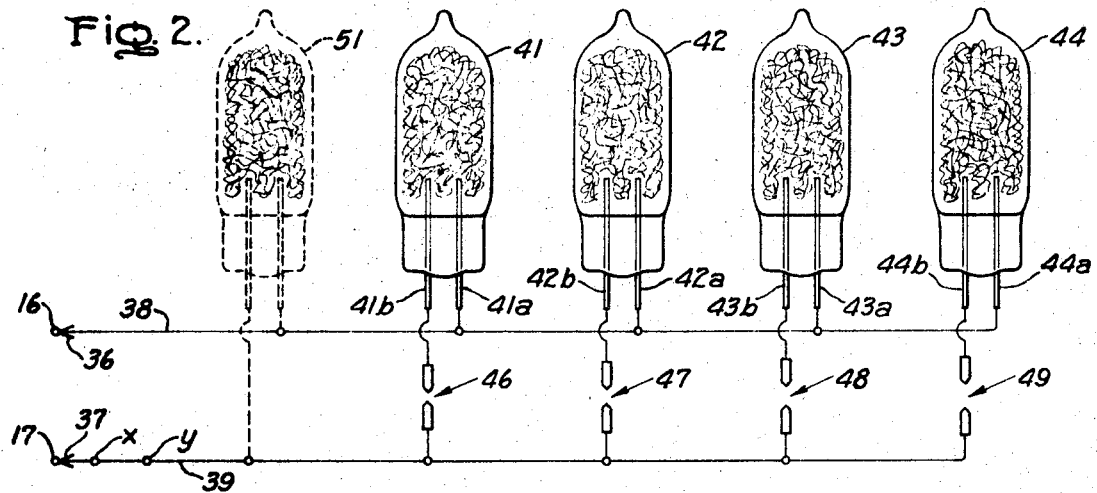
FIG. 2 is a diagram of an alternative preferred embodiment of the invention.

In FIG. 2, an electrical conductor 38 is connected to the connector 36 which is adapted to engage firing pulse terminal 16, and an electrical conductor 39 is connected to the connector 37 which is adapted to engage firing pulse terminal 17. A plurality of high-voltage flash lamps 41, 42, 43, 44 is provided, each of which may be similar to the lamp 26 described above, and each provided with a reflector adapted to direct the light from the lamps in the same given direction from the array of lamps. One lead wire 41a, etc., of each of the flash lamps 41-44 is connected to the electrical conductor 38, and the other lead wires 41b, etc., are respectively connected to the conductor 39 via individual arc gaps 46, 47, 48 and 49. Thus, each flash lamp is in series combination with its associated arc gap, and these series combinations are connected in parallel with each other across the conductors 38 and 39. The arc gaps 46-49 are designed to break down at different voltages. This may be achieved, with air gaps, if one of the arc gaps 46 has a spacing of 0.5 thousandths of an inch, another one 47 has a gap spacing of 1.5 thousandths of an inch, another 48 a gap spacing of 3 thousandths of an inch, and the remaining gap has a gap spacing of 5 thousandths of an inch. The arc gaps may also be specified in terms of their breakdown voltage, for example the gap 46 may be designed to break down at 300 volts, gap 47 at 600 volts, gap 48 at 900 volts, and gap 49 at 1200 volts.

The circuit of FIG. 2 functions as follows. Upon the first occurrence of a firing pulse at terminals 16 and 17, the lowest voltage breakdown gap 46 breaks down and the lamp 41 becomes flashed; there is insufficient firing pulse energy to break down any of the other arc gaps, and hence only the one lamp 41 will be flashed by the firing pulse. Upon flashing, the lamp becomes an open circuit, so that when the next firing pulse occurs, the lowest breakdown voltage gap associated with an unflashed lamp, i.e., the gap 47, will break down and the second lamp 42 will become flashed. This procedure repeats until all of the lamps have been flashed. It may first appear that the voltage breakdown of a gap becomes subtracted from the firing voltage applied to the associated lamp, and hence the last lamp 44, associated with the widest-spaced arc gap 49, might not reliably flash. However, this is not the case. Assume, for example, that the lamp 44 will flash at 500 volts of firing pulse voltage, the arc gap 49 breaks down at 1200 volts, and the firing pulse applied to the terminals 16 and 17 has a peak voltage of 1500 volts. The arc gap 49 will break down at 1200 volts, and the arc will have a voltage drop of only a few volts, the actual voltage drop depending somewhat on the arc current so that a peak voltage of about 1500 volts will be applied to the lamp 44, which is adequate for insuring reliable flashing.

If desired, an additional flash lamp 51 may be connected across the conductors 38 and 39, and will be the first to be flashed since there is no arc gap in series with it. Also, if desired, an additional arc gap 33, shown in FIG. 4, can be inserted between the points x and y in the conductor 39 of FIG. 2, between the connector 37 and the flash lamps, and will function upon each lamp flashing as described above in connection with FIG. 1.

Figure 3:
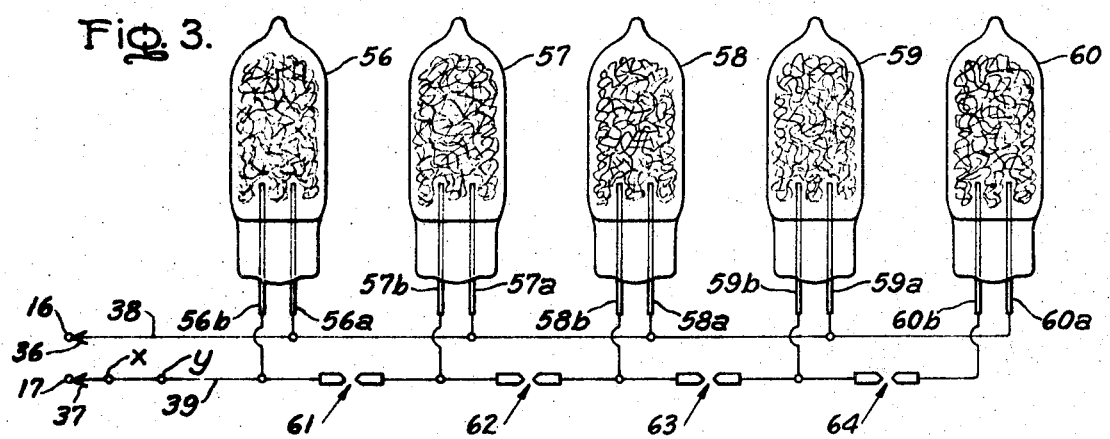
FIG. 3 is a diagram of a further alternative preferred embodiment of the invention.

The circuit of FIG. 3 comprises a plurality of high-voltage flash lamps 56-60 with the *a* lead wires thereof all connected to the conductor 38 which is connected to a connector 36 adapted to be removably connected to the firing pulse terminal 16, as in FIG. 2 above. The *b* lead wire of the first lamp 56 is connected to the connector 37 which is adapted to be connected to the firing pulse terminal 17 A plurality of arc gaps 61-64 are successively connected between the *b* lead wires of the lamps 56-60.

Figure 4:
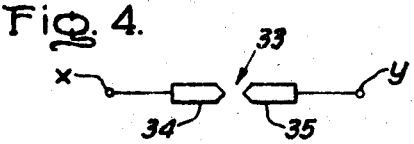
FIG. 4 illustrates an arc gap modification that may be incorporated in FIGS. 2 and 3.

The circuit of FIG. 3 functions as follows. Upon occurrence of the first firing pulse, the first lamp 56 will flash, since it receives the full firing pulse energy because the arc gap 61 does not break down and hence it prevents the firing pulse energy from reaching any of the other flash lamps. Upon the occurrence of a second firing pulse, the first lamp 56 is an open circuit, and hence the arc gap 61 will break down (because the firing pulse voltage is applied across it via the lamp 57) and the second lamp 57 will flash. A third firing pulse causes the first and second arc gaps 61 and 62 to break down, and the third lamp 58 will become flashed. This procedure continues, with additional numbers of arc gaps breaking down, until all of the flash lamps have been flashed. It may first appear that in order for the four arc gaps 61-64 to break down so that the last lamp 60 can flash, the required total breakdown voltage must be the sum of the individual breakdown voltages of the four arc gaps, and hence there may be doubt as to the reliability of the last lamp 60 becoming flashed. However, the plurality of series arc gaps will break down at less than the total sum of the individual breakdown voltages. This is due to differing capacitances across the arc gaps, which may be at random or may be designed into the construction of the arc gaps. The firing pulse voltage distribution across the various series-connected arc gaps will be distributed so that the greatest amount of voltage across an arc gap will be across that arc gap having the least capacitance between its electrodes, and when this arc gap breaks down and arcs, the rest of the arc gaps will quickly and readily break down and arc. For example, if all but the last lamp 60 have been flashed, and a firing pulse of 1500 volts is applied to the terminals 16 and 17, and each of the arc gaps 61-64 individually will break down at about 500 volts, and the lamp 60 requires 500 volts to flash, the voltage distribution of the 1500 volts across the series-connected arc gaps will be such that more than 500 volts will appear across one of the gaps, causing it to break down, whereupon the other arc gaps quickly break down, and, assuming a few volts drop at each arcing gap, the total arc gap voltage drop will be less than 100 volts, whereupon more than 1400 volts of the firing pulse will exist across the electrodes of lamp 60 thereby causing it to flash. The arc gaps 61-64 may be designed for similar, or differing, breakdown voltage characteristics for achieving optimum results. If desired, an additional arc gap 33, as shown in FIG. 4, may be inserted between the points x and y in FIG. 3, in a manner similar to that described above for FIG. 2. Preferably, the arc gap 33 is interposed in the conductor 39, as shown, which results in a lower capacitance across the gap than if the gap were interposed in the conductor 38 where it would have a higher capacitance thereacross due to stray capacitance of the lamp wiring. The lower gap capacitance improves the repetitive uniformity of breakdown voltage. The terminal 16 and conductor 38 should be considered as being the electrical ground of the circuit and may be connected electrically to the camera case or shutter mechanism.

It will be apparent that the invention, as described above, achieves a simple, light-weight, compact, and economical circuit for reliably flashing one or a plurality of high-voltage flash lamps. The arc gaps may be manufactured extremely economically, as each arc gap may comprise spaced-apart wires. In an even more economical construction, one of the electrodes of each arc gap may be the lead wire of the associated flash lamp, this lead wire being suitably spaced from another circuit wire, or from a printed-circuit conductor.

While preferred embodiments of the invention and modifications thereof have been shown and described, various other embodiments and modifications will become apparent to persons skilled in the art, and will fall within the scope of invention as defined in the following claims.

What I claim as new and desire to secure by Letters Patent of the United States is:

1. A photoflash circuit comprising a high-voltage photoflash lamp adapted to be flashed by a firing voltage, and an arc gap connected in electrical series with said flash lamp, said arc gap comprising a pair of spaced-apart electrodes having air therebetween and adapted to break down and arc in the air between said electrodes in response to said firing voltage being applied across the series combination of said flash lamp and arc gap, said circuit including at least one additional high-voltage flash lamp connected in electrical parallel with said first-named flash lamp, said flash lamps having relatively different flashing voltage characteristics.

2. A photoflash circuit comprising a high-voltage photoflash lamp adapted to be flashed by a firing voltage, and an arc gap connected in electrical series with said flash lamp, said arc gap comprising a pair of spaced-apart electrodes having air therebetween and adapted to break down and arc in the air between said electrodes in response to said firing voltage being applied across the series combination of said flash lamp and arc gap, said circuit including a piezoelectric firing pulse generator, and means connecting the series combination of said flash lamp and said arc gap across the output of said piezoelectric firing pulse generator.

3. A photoflash circuit for causing sequential flashing of a plurality of high-voltage photoflash lamps by means of sequential firing voltage pulses, comprising a plurality of arc gaps respectively connected in electrical series with said plurality of flash lamps thereby forming a plurality of series combinations, and means connecting said series combinations in an electrical parallel combination adapted to be connected across a source of said firing pulses, said arc gaps having relatively different voltage breakdown values with respect to one another, said voltage breakdown values being less than the voltage of said firing voltage pulses.

4. A circuit as claimed in claim 3, including an additional arc gap connected in electrical series with said parallel combination so as to be interposed between said parallel combination and said source of firing pulses.

5. A circuit as claimed in claim 3, including an additional high-voltage flash lamp connected directly in electrical parallel with said parallel combination.

6. A circuit as claimed in claim 5, including an additional arc gap connected in electrical series with the parallel circuit of said parallel combination and said additional lamp so as to be interposed between said parallel circuit and said source of firing pulses.

7. A photoflash circuit for causing sequential flashing of a plurality of high-voltage photoflash lamps by means of sequential firing voltage pulses, comprising means including a plurality of arc gaps successively connected in electrical series between said plurality of flash lamps so as to connect the lamps in an electrical parallel combination through said arc gaps, and means adapted for connecting an end of said parallel combination across a source of said firing pulses, said arc gaps each comprising a pair of spaced-apart electrodes having air therebetween and having a voltage breakdown value less than the voltage of said firing voltage pulses, said circuit including an additional arc gap connected in series with said parallel combination so as to be interposed between said parallel combination and said source of firing pulses.

* * * * *